(12) United States Patent
Brown et al.

(10) Patent No.: US 8,675,917 B2
(45) Date of Patent: Mar. 18, 2014

(54) ABANDONED OBJECT RECOGNITION USING PEDESTRIAN DETECTION

(75) Inventors: Lisa M. Brown, Pleasantville, NY (US); Rogerio S. Feris, White Plains, NY (US); Frederik C. Kjeldsen, Poughkeepsie, NY (US); Kristina Scherbaum, Saarbruecken (DE)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 13/285,354

(22) Filed: Oct. 31, 2011

(65) Prior Publication Data

US 2013/0108102 A1 May 2, 2013

(51) Int. Cl.
*G06K 9/00* (2006.01)
*H04N 5/225* (2006.01)

(52) U.S. Cl.
USPC .......................... 382/103; 382/291; 348/169

(58) Field of Classification Search
USPC ......... 382/100, 103, 106–107, 115–118, 123, 382/155, 162, 168, 173, 181, 189–195, 199, 382/203, 209, 224, 232, 254, 274, 276, 278, 382/291, 305, 312; 348/169; 73/514.32
See application file for complete search history.

(56) References Cited

U.S. PATENT DOCUMENTS

| | | | |
|---|---|---|---|
| 7,243,545 B2* | 7/2007 | Sakai et al. ................ | 73/514.32 |
| 7,243,845 B2 | 7/2007 | Cash et al. | |
| 7,321,386 B2* | 1/2008 | Mittal et al. ................ | 348/169 |
| 7,620,266 B2* | 11/2009 | Brown et al. ................ | 382/278 |
| 7,813,528 B2* | 10/2010 | Porikli et al. ................ | 382/103 |
| 2005/0036658 A1 | 2/2005 | Gibbins et al. | |
| 2005/0073585 A1 | 4/2005 | Ettinger | |
| 2009/0238462 A1 | 9/2009 | Feris et al. | |
| 2009/0290020 A1 | 11/2009 | McLeish et al. | |
| 2010/0322475 A1* | 12/2010 | Ikeda ................ | 382/103 |

OTHER PUBLICATIONS

Bhargava et al., "Detection of Abandoned Objects in Crowded Environments," IEEE Conference—Advanced Video and Signal Based Surveillance, pp. 271-276 (Sep. 2007).*
Yang Li et al., "Robust Detection of Abandoned and Removed Objects in Complex Surveillance Videos," IEEE Transactions on Systems, Man, and Cybernetics Part C: Applications and Review, vol. 41, No. 5, pp. 565-576 (Sep. 2011).
Chang et al., "Localized Detection of Abandoned", EURASIP Journal in Advances in Signal Processing, vol. 2010, Article ID 675784, 9 pages (2010).

(Continued)

*Primary Examiner* — Seyed Azarian
(74) *Attorney, Agent, or Firm* — Ryan, Mason & Lewis, LLP (57) ABSTRACT

Methods and apparatus are provided for improved abandoned object recognition using pedestrian detection. An abandoned object is detected in one or more images by determining if one or more detected objects in a foreground of the images comprises a potential abandoned object; applying a trained pedestrian detector to the potential abandoned object to determine if the potential abandoned object comprises at least a portion of a pedestrian; and classifying the potential abandoned object as an abandoned object based on whether the potential abandoned object is not at least a portion of a pedestrian. The trained pedestrian detector is trained using positive training samples comprised of at least portions of human bodies in one or more poses and/or negative training samples comprised of at least portions of abandoned objects.

22 Claims, 4 Drawing Sheets

(56) References Cited

OTHER PUBLICATIONS

Li, "Abandoned Objects Detection Using Double Illumination Invariant Foreground Masks", 2010 International Conference on Pattern Recognition, pp. 436-439, (2010).

Mitra B.K. et al., "A Two-Stage Approach to Detect Abandoned Baggage in Public", Proc of SPIE. vol. 7701 (2010).

Kwak et al., "Abandoned luggage detection using a finite state automaton in surveillance video", Optical Engineering, vol. 49(2), (2010).

* cited by examiner

ABANDONED OBJECT RECOGNITION USING PEDESTRIAN DETECTION

FIELD OF THE INVENTION

The present invention relates generally to the electrical, electronic and computer arts, and, more particularly, to techniques for abandoned object recognition in video images.

BACKGROUND OF THE INVENTION

There is a growing demand for automated video surveillance (AVS) systems for public safety and security enhancement. While traditional video surveillance methods require constant human attention, automated visual analysis performs real-time monitoring of people, vehicles and other objects, and generates alerts when suspicious persons or abnormal activity are detected. Such automatic analysis significantly increases the effectiveness of the monitoring by reducing the number of human operators needed, thus is crucial for urban surveillance where over thousands of cameras are set up to monitor a large area on the scale of a city.

Abandoned Object Detection (AOD) techniques detect bags, luggage or other objects that may be left unattended in public places, such as airports. A number of techniques have been proposed or suggested for abandoned object detection. See, for example, Y. L. Tian et al., "Real-Time Detection of Abandoned and Removed Objects in Complex Environments," IEEE Int'l Workshop on Visual Surveillance (2008), incorporated by reference herein. Nonetheless, lighting changes, occlusions and cluttered backgrounds remain technical challenges.

AOD systems typically detect static objects in a scene, using background modeling and subtraction (BGS). However, a number of non-threatening objects are often observed staying static (such as cars stopping at a red light) or near static (pedestrians standing still on the street) for a short period of time. Moreover, temporarily static objects, if not properly handled, would pose serious adverse effects on background subtraction. Generally, traditional BGS approaches such as the Gaussian mixtures model will gradually adapt people that are standing or sitting still into the background, and as a result, AOD techniques based on BGS may confuse the still people with a suspicious object.

Thus, to minimize the false detection of abandoned objects, a need exists for improved techniques for classifying objects as either a non-threatening object or a suspicious object. A further need exists for improved abandoned object detectors that employ pedestrian detection techniques to distinguish abandoned objects from people.

SUMMARY OF THE INVENTION

Generally, methods and apparatus are provided for improved abandoned object recognition using pedestrian detection. According to one aspect of the invention, an abandoned object is detected in one or more images by determining if one or more detected objects in a foreground of the images comprises a potential abandoned object; applying a trained pedestrian detector to the potential abandoned object to determine if the potential abandoned object comprises at least a portion of a pedestrian; and classifying the potential abandoned object as an abandoned object based on whether the potential abandoned object is not at least a portion of a pedestrian.

In one embodiment, the trained pedestrian detector is trained using positive training samples and/or negative training samples. The positive training samples are comprised of at least portions of human bodies in one or more poses. The negative training samples are comprised of at least portions of abandoned objects.

According to another aspect of the invention, an abandoned object is detected in one or more images by determining whether a potential abandoned object has been put down by a person and/or whether the potential abandoned object has been left by a person. An alarm can be triggered if the potential abandoned object is classified as an abandoned object.

Additional validation tests can optionally be performed to determine if (i) a size of the potential abandoned object meets predefined criteria for an abandoned object; (ii) if the potential abandoned object satisfies predefined abandoned time criteria; and/or (iii) if an occlusion of the potential abandoned object in the images exceeds a predefined threshold, t.

A more complete understanding of the present invention, as well as further features and advantages of the present invention, will be obtained by reference to the following detailed description and drawings.

DETAILED DESCRIPTION OF PREFERRED EMBODIMENTS

The present invention provides improved abandoned object detection using pedestrian recognition. The present invention recognizes that people in an image scene that are entirely or partially still are a common source of false detection of abandoned objects. Thus, according to one aspect of the invention, a pedestrian detector is employed in an abandoned object detector to improve the detection of abandoned objects. As discussed further below, the pedestrian detector distinguishes abandoned objects from people.

Training

Figure 1:
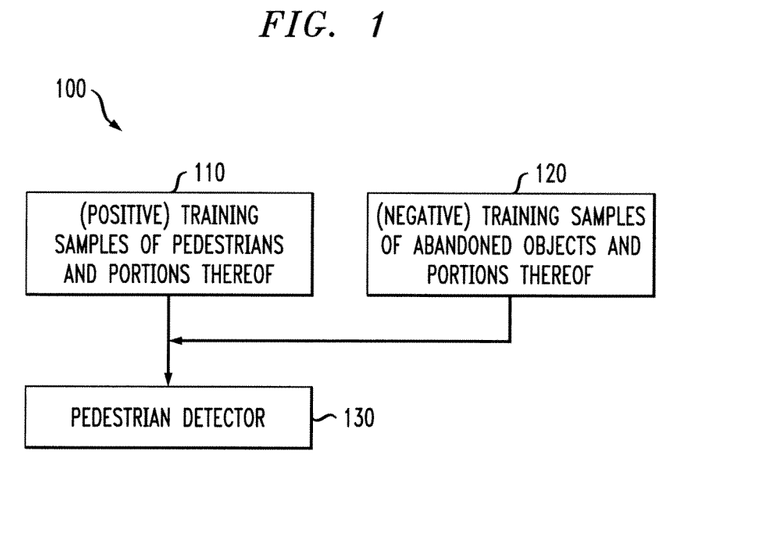
FIG. 1 illustrates an exemplary technique for training a pedestrian detector employed by the present invention.

FIG. 1 illustrates an exemplary technique 100 for training the pedestrian detector 130 employed by the present invention. Generally, the pedestrian detector is trained using standard machine learning algorithms on images from scenes in which abandoned objects are falsely found (i.e., negative training examples of human bodies and portions thereof) and accurately found (i.e., positive training examples of various realistic abandoned objects). Thus, in one exemplary implementation, the pedestrian detector is trained using human bodies and portions thereof, as well as abandoned objects and portions thereof.

The pedestrian detector 130 is a classifier that can be based on any standard machine learning classifier such as Adaboost or support vector machines (SVMs). As discussed further below in conjunction with FIG. 3, the pedestrian detector 130 is run after the background subtraction algorithm has identified a region of the foreground as being temporarily static.

As shown in FIG. 1, a training process 100 in accordance with the present invention applies positive training samples 110 comprised of human bodies in various poses and portions thereof, as well as negative training samples 120 comprised of various abandoned objects and portions thereof, to train a pedestrian detector 130. The pedestrian detector 130 is discussed further below in conjunction with FIG. 3.

Abandoned Object Detection using Background Analysis

Abandoned object detectors must typically detect static objects in a scene. Many normal objects, however, are often observed staying static (such as cars stopping at a traffic light) or near static (still pedestrians on the street) in the scene for a short time period. As indicated above, distinguishing objects as either a non-threatening object or a suspicious object is an important issue to address in reducing false alarms.

Figure 2:
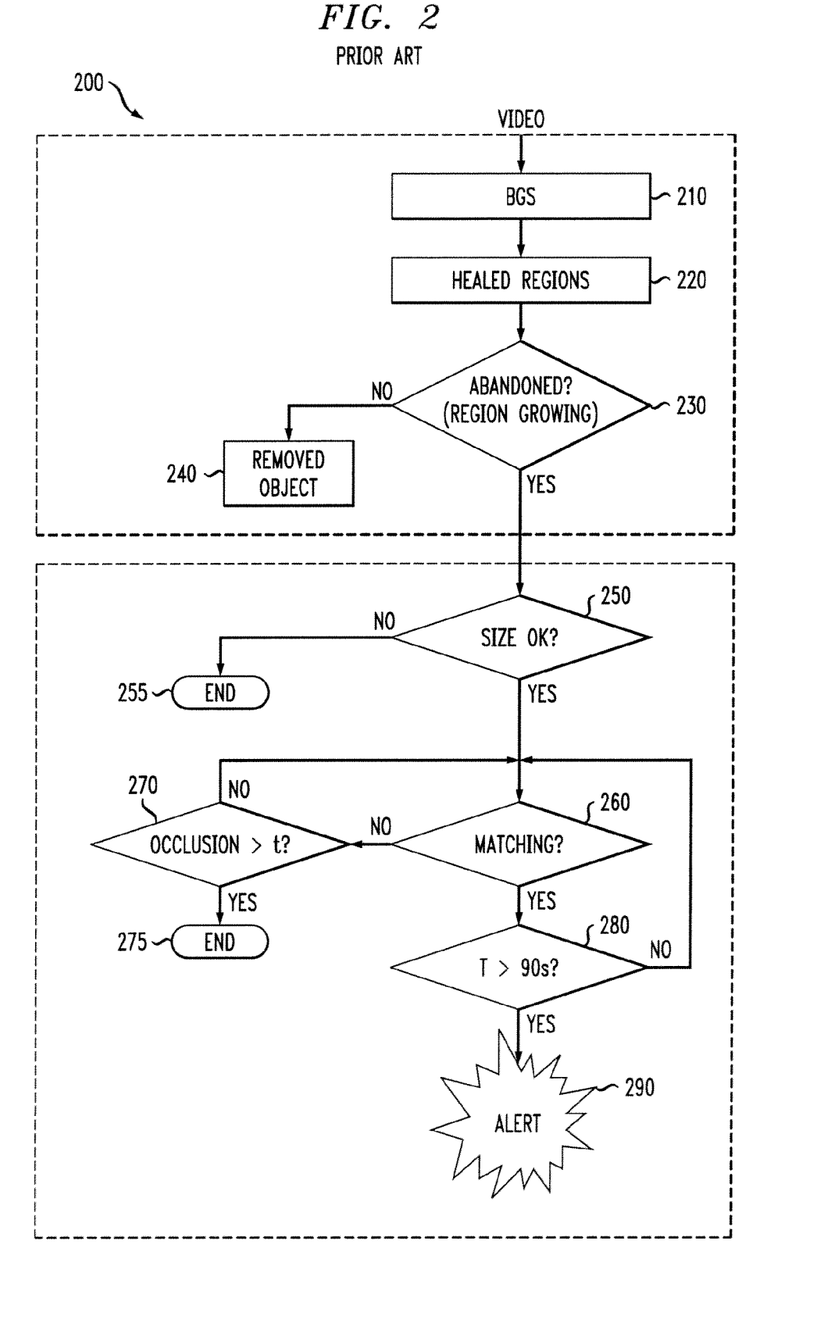
FIG. 2 is a flow chart describing an exemplary conventional abandoned object detection process.

FIG. 2 is a flow chart describing an exemplary conventional abandoned object detection process 200. As shown in FIG. 2, the exemplary abandoned object detection process 200 initially processes input video images using a background subtraction (BGS) technique during step 210. Generally, background subtraction techniques detect moving objects in the stationary background. See, e.g., Ying-Li Tian et al., "Robust and Efficient Foreground Analysis for Real-Time Video Surveillance," Proc. of the 2005 IEEE Computer Society Conference on Computer Vision and Pattern Recognition (CVPR '05), Vol. 1 (2005) or Ying-Li Tian et al., "Robust Detection of Abandoned and Removed Objects in Complex Surveillance Videos," IEEE Trans. On Systems, Man, and Cybernetics, Part C: Applications and Reviews (September 2011), each incorporated by reference herein.

To reduce foreground fragments, a healing technique is applied during step 220. See, e.g., Ying-Li Tian et al., "Robust and Efficient Foreground Analysis for Real-Time Video Surveillance," CVPR '05. "Healing" refers to pixels which appear static and might be ready to be pushed to the current background model. Foreground fragments are usual for many background subtraction methods. In the mixture of Gaussians background subtraction method, the different parts of a static region are often updated to the background model at different speeds based on the similarity of the pixel values between the static region and the background model. Healing pushes back the static region to the background model when the static region is biggest (i.e., before it starts shrinking), to avoid the fragment of the foreground.

After static regions are detected and healed (i.e., pushed into the background), the exemplary abandoned object detection process 200 classifies whether the healing corresponds to an abandoned or removed object event during step 230. A mixture of Gaussians method can be employed to classify a background object as an abandoned object or a removed object. See, e.g., Ying-Li Tian et al., "Robust Detection of Abandoned and Removed Objects in Complex Surveillance Videos," IEEE Trans. On Systems, Man, and Cybernetics, Part C: Applications and Reviews (September 2011). The mixture of Gaussians method can deal with slow lighting changes, periodical motions from clutter background, slow moving objects, long term scene changes, and camera noises.

The mixture of Gaussians method can be employed during step 230 to analyze the foreground as moving objects, abandoned objects, or removed objects (ghosts) while detecting the background. Generally, the intensity and texture information are integrated to remove shadows and to make the algorithm work for quick lighting changes. The "region growing" method explores similarities between the static region and its surroundings both in the frame and background images. See also, Y. L. Tian et al., "Real-Time Detection of Abandoned and Removed Objects in Complex Environments," IEEE Int'l Workshop on Visual Surveillance (2008). Generally, region growing techniques determine if an object has a reasonable contour to constitute a real object (as opposed to, for example, a shadow). In a further variation, a region segmentation method can be applied to group the pixels into meaningful objects. Region growing and region segmentation help to ignore certain lighting changes that influence the relative intensity of the pixels but do not make a cohesive region which is distinct from the background, in a known manner.

If an object is classified as a removed object during step 230, it is outside the scope of the present invention and program control terminates during step 240 or proceeds in a conventional manner for removed objects. The decision could be based on, for example, the fusion between region segmentation or size and pedestrian detection.

If an object is classified as an abandoned object during step 230, program control proceeds to step 250, where a test is performed to determine if the size of the object meets predefined criteria for an abandoned object. For example, step 250 can determine whether the detected object has a reasonable size for luggage. In addition, the exemplary test performed step during 250 can determine whether the detected object has a comparable height to an average human height (suggesting that the object is a person and should be ignored). In a further variation, the test performed step during 250 can also or alternatively determine whether the detected object is too large or small or another unreasonable aspect of size. If it is determined during step 250 that the size of the object does not meet predefined criteria for an abandoned object, then the object is not considered an abandoned object and program control terminates during step 255.

If, however, it is determined during step 250 that the size of the object meets predefined criteria for an abandoned object, then a further test is performed during step 260 to determine if the abandoned object matches predefined abandoned time criteria (i.e., whether the object was there long enough). A static object, before claimed as a true abandoned object, is usually required to stay a minimum amount of time in the scene (for example, half a minute to several minutes). In this manner, template matching ensures that the object stays at least the minimum amount of time (usually specified by the user) before an alert is fired for human adjudication.

If it is determined during step 260 that the abandoned object does not match the predefined abandoned time criteria, then a further test is performed during step 270 to determine if the occlusion (i.e., the visual merging) of the objects in the images exceeds a predefined threshold, L. For a more detailed discussion of the evaluation of occlusion in images, see, for example, Ying-Li Tian et al., "Robust and Efficient Foreground Analysis for Real-Time Video Surveillance," Proc. of the 2005 IEEE Computer Society Conference on Computer Vision and Pattern Recognition (CVPR '05), Vol. 1 (2005); Ying-Li Tian et al., "Robust Detection of Abandoned and Removed Objects in Complex Surveillance Videos," IEEE Trans. On Systems, Man, and Cybernetics, Part C: Applications and Reviews (September 2011), or Q. Fan, "Modeling of Temporarily Static Objects for Robust Abandoned Object Detection in Urban Surveillance," IEEE Intl Conf. on Advanced Video and Signal-Based Surveillance (AVSS) (2011), each incorporated by reference herein. Generally, it is determined that the abandoned object does not match the predefined abandoned time criteria, then an assumption is made that the object is occluded. If the object is only occluded for a short time,—can continue to test if the occlusion of the objects in the images exceeds a predefined threshold, t.

If it is determined during step 270 that the occlusion exceeds the predefined threshold, t, then the merged objects are unreliable (assumed to be occluded) and program control terminates during step 275. If, however, it is determined during step 270 that the occlusion does not exceed the predefined threshold, t, then program control returns to step 260 until the abandoned object matches the predefined abandoned time criteria.

A final test is performed during step 280, to determine if a second time threshold, T, exceeds, for example, 90 seconds, before an alert is fired during step 290, e.g., for human resolution. In this manner, the user can optionally define how long an object should be abandoned before an alarm is triggered.

Abandoned Object Detection using Pedestrian Detector

Figure 3:
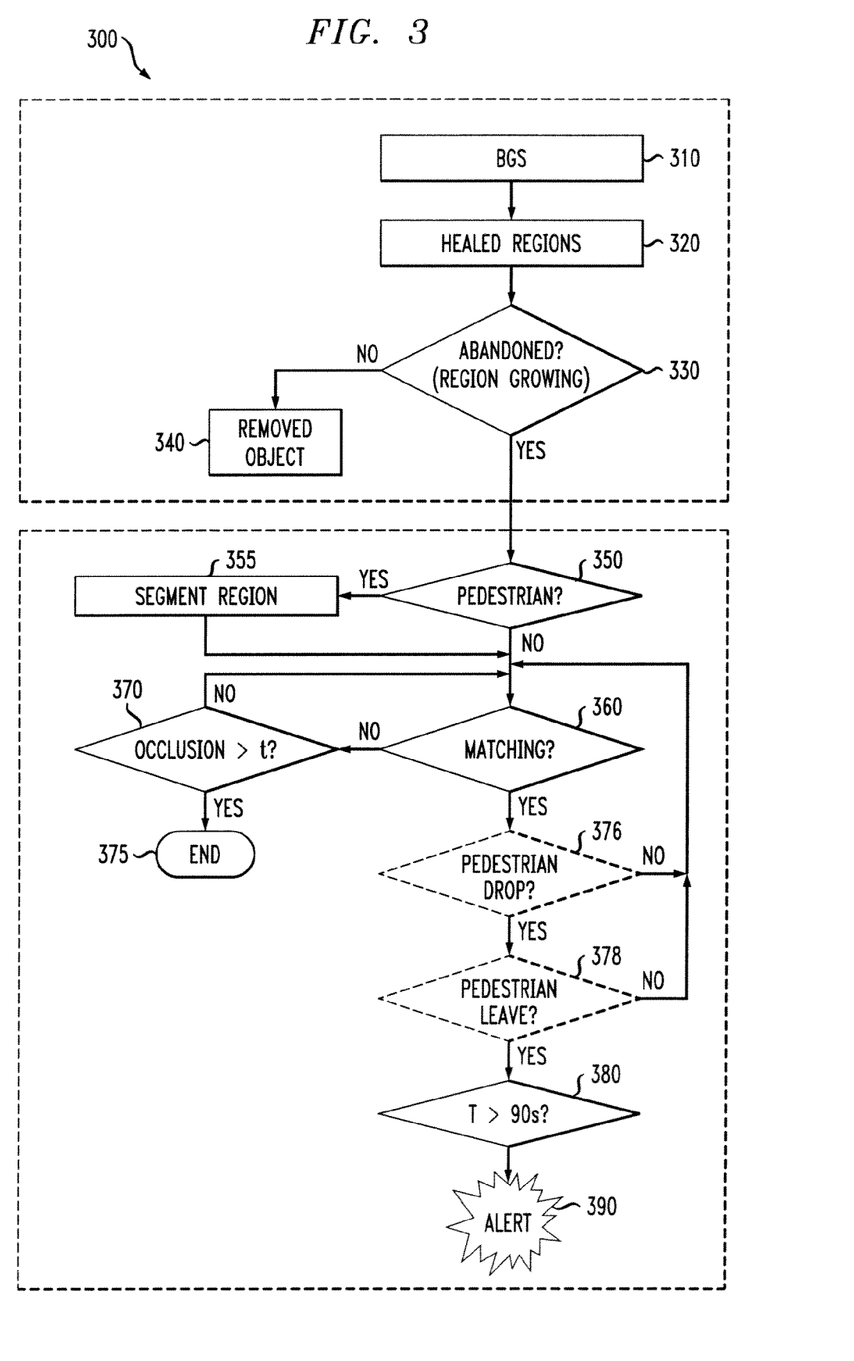
FIG. 3 is a flow chart describing an exemplary abandoned object detection process incorporating aspects of the present invention.

FIG. 3 is a flow chart describing an exemplary abandoned object detection process 300 incorporating aspects of the present invention. As shown in FIG. 3, the exemplary abandoned object detection process 300 initially performs a number of steps 310, 320, 330, 340, to perform background subtraction and static region detection and object type detection (i.e., abandoned or removed object), in a similar manner to the corresponding steps of the exemplary abandoned object detection process 200 in FIG. 2.

The exemplary abandoned object detection process 300 applies a trained pedestrian detector 130 (FIG. 1) to the potential abandoned object during step 350 in accordance with the present invention, to improve the detection of abandoned objects. The pedestrian detector 130 distinguishes abandoned objects from people. As discussed above in conjunction with FIG. 1, the pedestrian detector 130 is constructed from a large set of training samples that include both positive examples of abandoned objects and negative examples of random background scenery. The negative examples can also include examples of typical false positives as generated by an abandoned object detection system and from a dataset of pedestrian images. Both full body pedestrian and partial pedestrian images are used.

If it is determined during step 350 that the detected object is a person, then the region is segmented during step 355. If there is still a region not explained by the pedestrian detection which is a reasonable size and passes the region test (and any other desired tests), then program control returns to the abandoned object testing to see if the object remains long enough and does not get occluded.

If it is determined during step 350 that the detected object is not a person, then a further test is performed during step 360 to determine if the abandoned object matches predefined abandoned time criteria (i.e., whether the object was there long enough), in a similar manner to the exemplary conventional abandoned object detection process 200 of FIG. 2. A static object, before claimed as a true abandoned object, is usually required to stay a minimum amount of time in the scene (for example, half a minute to several minutes). The size of the detected object can also be evaluated against predefined criteria for an abandoned object, as discussed above in conjunction with FIG. 2.

If it is determined during step 360 that the abandoned object does not match the predefined abandoned time criteria, then a further test is performed during step 370 to determine if the occlusion (i.e., the visual merging) of the objects in the images exceeds a predefined threshold, t, in a similar manner to the exemplary conventional abandoned object detection process 200 of FIG. 2.

If it is determined during step 370 that the occlusion exceeds the predefined threshold, t, then the merged objects are unreliable and program control terminates during step 375. If, however, it is determined during step 370 that the occlusion does not exceed the predefined threshold, t, then program control returns to step 360 until the abandoned object matches the predefined abandoned time criteria.

Once the abandoned object satisfies the predefined abandoned time criteria during step 360, an optional test is performed during step 376, to determine if a pedestrian has dropped the detected object. Generally, the test performed during step 376 determines if an object was put down by detecting and tracking the person prior to and proximal to the abandoned object detection.

If it is determined during step 376 that a pedestrian has not dropped the object, then program control returns to step 360

If, however, it is determined during step 376 that a pedestrian has dropped the object, then a further optional test is performed during step 378, to determine if the pedestrian has now left the area. Generally, the test performed during step 378 determines if there is a person leaving after the detected object was put down by detecting and tracking the person after and proximal to the abandoned object detection.

In this manner, action identification is another mechanism used to improved abandoned object detection. Action identification is based on detection of actions such as when an object is put down or when a person leaves after putting an object down. Abandoned object detection is thus substantiated by semantically relevant events.

A final test is performed during step 380, to determine if a second time threshold, T, exceeds, for example, 90 seconds, before an alert is fired during step 390, e.g., for human resolution. In this manner, the user can optionally define how long an object should be abandoned before an alarm is triggered.

As previously indicated, the above-described embodiments of the invention are presented by way of illustrative example only. Numerous variations and other alternative embodiments may be used. For example, as discussed herein, an important aspect of abandoned object detection is based on measuring properties of the temporarily static object to determine the likelihood of a true positive. While a number of exemplary properties have been addressed herein, additional or alternative properties can be employed, such as time stability, spatial stability, vertical motion, distribution weight constraints, size and aspect ratio. These metrics attempt to verify that the region is a realistic real-world object that is static long enough and to remove lighting changes.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
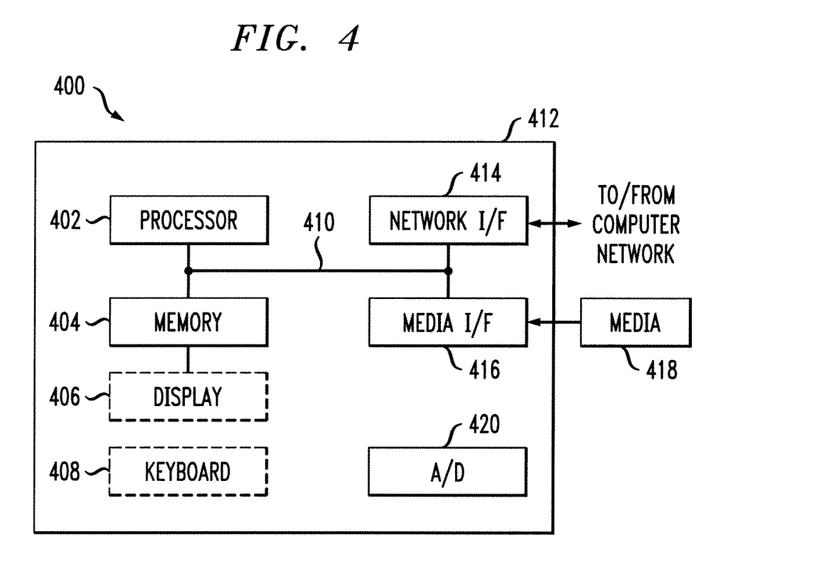
FIG. 4 depicts an exemplary abandoned object detector that may be useful in implementing one or more aspects and/or elements of the present invention.

One or more embodiments can make use of software running on a general purpose computer or workstation. FIG. 4 depicts an exemplary abandoned object detector 400 that may be useful in implementing one or more aspects and/or elements of the present invention. With reference to FIG. 4, such an implementation might employ, for example, a processor 402, a memory 404, and an input/output interface formed, for example, by a display 406 and a keyboard 408. The memory 404 may store, for example, code for implementing the layout process 300 of FIG. 3.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Analog-to-digital converter(s) 420 may be provided to receive analog input, such as analog video feed, and to digitize same. Such converter(s) may be interconnected with system bus 410.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 502. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for detecting an abandoned object in one or more images, comprising:
   determining if one or more detected objects in a foreground of said images comprises a potential abandoned object;
   applying a trained pedestrian detector to said potential abandoned object to determine if said potential abandoned object comprises at least a portion of a pedestrian, wherein said trained pedestrian detector is trained using positive training samples comprised of at least portions of human bodies in one or more poses; and
   classifying said potential abandoned object as an abandoned object based on whether said potential abandoned object is not at least a portion of a pedestrian, wherein at least one of said determining, applying and classifying steps are performed by at least one hardware device.

2. The method of claim 1, wherein said trained pedestrian detector is trained using one or more positive training samples and negative training samples.

3. The method of claim 2, wherein said negative training samples are comprised of at least portions of abandoned objects.

4. The method of claim 1, further comprising the step of determining whether said potential abandoned object has been put down by a person.

5. The method of claim 1, further comprising the step of determining whether said potential abandoned object has been left by a person.

6. The method of claim 1, further comprising the step of triggering an alarm if said potential abandoned object is classified as an abandoned object.

7. The method of claim 1, further comprising the step of processing said one or more images using a background subtraction (BGS) technique to detect moving objects in a stationary background.

8. The method of claim 1, further comprising the step of applying a healing technique to reduce foreground fragments.

9. The method of claim 1, wherein said determining step applies a mixture of Gaussians method to classify a background object as said abandoned object.

10. The method of claim 1, further comprising the step of determining if a size of said potential abandoned object meets predefined criteria for an abandoned object.

11. The method of claim 1, further comprising the step of determining if said potential abandoned object satisfies predefined abandoned time criteria.

12. The method of claim 1, further comprising the step of determining if an occlusion of said potential abandoned object in said images exceeds a predefined threshold, t.

13. An apparatus for detecting an abandoned object in one or more images, said apparatus comprising:
  a memory; and
  at least one hardware device, coupled to the memory, operative to:
  determine if one or more detected objects in a foreground of said images comprises a potential abandoned object;
  apply a trained pedestrian detector to said potential abandoned object to determine if said potential abandoned object comprises at least a portion of a pedestrian, wherein said trained pedestrian detector is trained using positive training samples comprised of at least portions of human bodies in one or more poses; and
  classify said potential abandoned object as an abandoned object based on whether said potential abandoned object is not at least a portion of a pedestrian.

14. The apparatus of claim 13, wherein said trained pedestrian detector is further trained using negative training samples comprised of at least portions of abandoned objects.

15. The apparatus of claim 13, wherein said at least one hardware device is further configured to determine whether said potential abandoned object has been put down by a person.

16. The apparatus of claim 13, wherein said at least one hardware device is further configured to determine whether said potential abandoned object has been left by a person.

17. The apparatus of claim 13, wherein said at least one hardware device is further configured to trigger an alarm if said potential abandoned object is classified as an abandoned object.

18. The article of manufacture of claim 13, further comprising the step of triggering an alarm if said potential abandoned object is classified as an abandoned object.

19. An article of manufacture for detecting an abandoned object in one or more images, comprising a tangible machine readable recordable storage medium containing one or more programs which when executed implement the step of:
  determining if one or more detected objects in a foreground of said images comprises a potential abandoned object;
  applying a trained pedestrian detector to said potential abandoned object to determine if said potential abandoned object comprises at least a portion of a pedestrian, wherein said trained pedestrian detector is trained using positive training samples comprised of at least portions of human bodies in one or more poses; and
  classifying said potential abandoned object as an abandoned object based on whether said potential abandoned object is not at least a portion of a pedestrian.

20. The article of manufacture of claim 19, wherein said trained pedestrian detector is further trained using negative training samples comprised of at least portions of abandoned objects.

21. The article of manufacture of claim 19, further comprising the step of determining whether said potential abandoned object has been put down by a person.

22. The article of manufacture of claim 19, further comprising the step of determining whether said potential abandoned object has been left by a person.

* * * * *